May 28, 1968  A. MEIER ET AL  3,385,175
PISTON
Filed Oct. 7, 1966
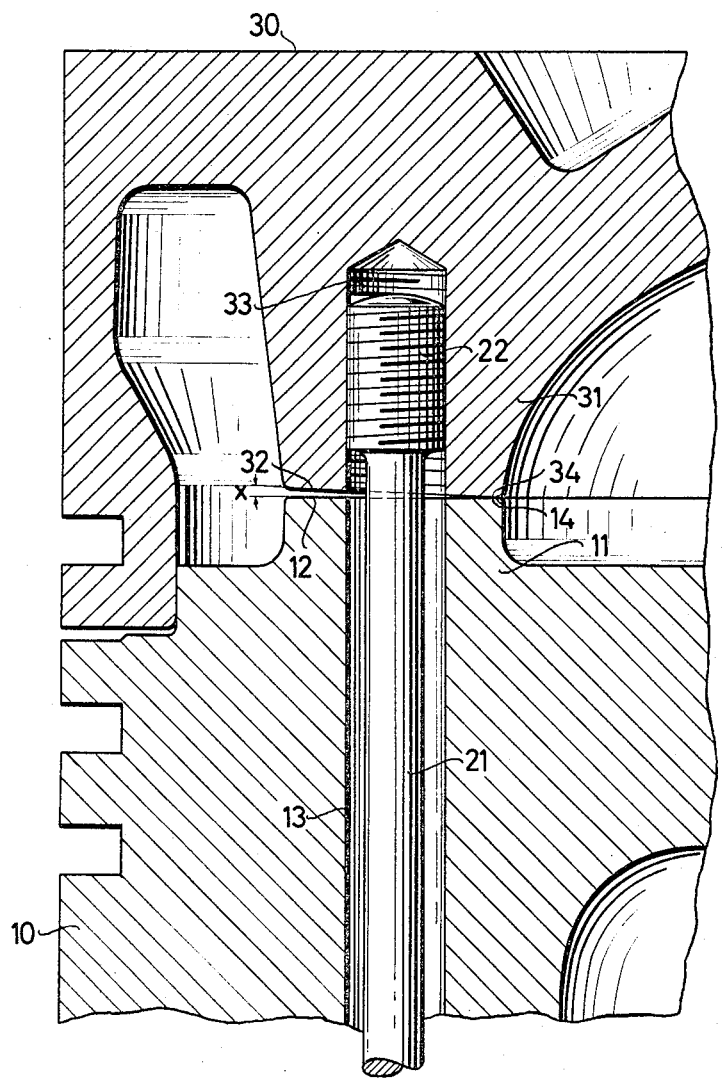
INVENTORS
Alfred Meier
Rudolf Maier
BY
Bailey, Stephens+Huettig
ATTORNEYS

United States Patent Office 3,385,175
Patented May 28, 1968

3,385,175
PISTON
Alfred Meier, Nellingen, uber Esslingen, and Rudolf Maier, Stuttgart-Weilimdorf, Germany, assignors to Mahle Komm.-Ges., Stuttgart-Bad Connstatt, Germany
Filed Oct. 7, 1966, Ser. No. 585,087
Claims priority, application Germany, June 15, 1966, M 69,849
1 Claim. (Cl. 92—176)

ABSTRACT OF THE DISCLOSURE

A piston having a light metal body and a separable head of low heat conductivity held together with bolts, the surfaces of intersection of the body and head forming an outwardly diverging slot with said surfaces being in contact only at their inner edges at room temperature.

---

This invention relates to a piston and in particular to the manner in which a piston head is fastened to the body of the piston.

Pistons for internal combustion engines, and especially for fast-running diesel engines, are made of a light metal body with a piston head secured to the body and composed of a metal having better heat resistance and lower heat conductivity than the light metal, for example, steel. Bolts are used to fasten the head to the body, which bolts are preferably expansion bolts extending parallel to the piston axis. The bolts are threaded into the piston head and are tightened against a flange in the piston ring zone of the body.

In pistons of this type, the piston body has a circular rib top surface and the piston head has a corresponding circular rib bottom surface so that the surfaces are parallel to each other and bear on each other throughout their entire extent at room temperature.

At engine running temperatures, the crown of the piston head in the cylinder becomes hotter than the bottom surface of the head which faces the piston body. Consequently, the piston head bends to the outside and its bottom annular rib surface through which the bolts extend becomes inclined and the bottom surface facing the piston body tilts around its outer edge and thus no longer contacts the top surface of the piston body at the radially inner edge of the rib surface. This results in that the bolts are stretched and, at the same time, bent outwardly. As a rule, the bolts cannot withstand such double-duty stress. Consequently, they often tear, usually at the point which is most heavily subjected to the bending stress, namely, on the radial inner half of the bolt nearest the axis of the piston.

Attempts have been made to avoid this disadvantage by supporting the ends of the bolts in joints permitting the stem of the bolt to be angularly displaced in order to avoid the bending stresses. These constructions are relatively awkward and expensive.

The object of this invention is to produce a piston construction in which the danger of breaking the bolts is avoided by inexpensive means, and in which, in critical cases, such means can be used in addition to the angular displacement of the stem of the bolt.

In this invention, the facing annular rib surfaces of the piston head and piston body are formed so that, at room temperature and with the bolts not completely tightened, a slot is formed between the surface which diverges radially outwardly of the piston so that the surfaces are in contact only at their radially inward edges.

After a cold engine is started and warms to operating temperature, the bending of the piston head causes the slot to narrow. The bolts are not stretched and are only slightly bent, which bending, as has been found in practice, is absorbed by the bolt stems alone without damage and especially when conventional expanding bolts are used. If needed, the bolts can be tightened at room temperature so that the slot at least becomes smaller or is closed. As the piston head is heated during the warming of the engine to operating temperature, the stresses in the piston head are reduced so that the load on the bolts is not increased.

The means by which the objects of the invention are obtained are described more fully with reference to the accompanying drawing which shows a cross-sectional view through a portion of the piston.

The piston has a light metal body 10. On the top of the body is a circular rib 11 having a top surface 12. Bores 13 extend through the piston body and the circular rib 11 for receiving the holding bolts. Each bolt is composed of an expansion shaft 21, a threaded end 22 and a bolt head, not shown. The bolt heads are tightened against a flange, not shown, on the piston body 10.

Piston head 30 has a circular rib 31 with a bottom surface 32 which lies opposite the top surface 12 of the piston body. Rib 31 has threaded bores 33 aligned with bores 13 in the piston body. The surfaces 12 and 32 are inclined with respect to one another to form an acute angle in such a manner that the surfaces are in contact only at their radially inner edges 14 and 34. A slot is formed which diverges outwardly with the outer edges of the surfaces spaced a distance $x$. This distance, for purposes of clarity, has been exaggerated in the drawing. Actually the slot angle is about 5 minutes and the distance $x$ is only a few tenths of a milimeter, which is quite sufficient in order to obtain the desired results.

Having now described the means by which the objects of the invention are obtained, we claim:

1. In a piston for an internal combustion engine, especially a fast-running diesel engine, comprising a light metal piston body having a circular rib top surface, a piston head composed of a high heat resistant and low heat conductivity metal having a corresponding circular rib bottom surface adapted to bear upon said top surface, and expansion bolt means extending through said body, the top surface and the bottom surface, and threaded in said piston head for holding said piston head on said body, the improvement in which at least one surface is radially outwardly inclined with respect to the other surface to form an outwardly diverging slot and with said surfaces at room temperature being in contact only at their inner edges.

References Cited

UNITED STATES PATENTS

| | | | |
|---|---|---|---|
| 560,918 | 5/1896 | Oderman | 123—41.35 X |
| 1,605,810 | 11/1926 | Cormier | 92—221 X |
| 3,215,130 | 11/1965 | Maier | 123—41.35 |

MARTIN P. SCHWADRON, *Primary Examiner.*

G. N. BAUM, *Assistant Examiner.*